United States Patent
Lee et al.

(10) Patent No.: US 10,535,906 B2
(45) Date of Patent: Jan. 14, 2020

(54) BATTERY MODULE

(71) Applicant: LG CHEM, LTD., Seoul (KR)

(72) Inventors: Jong-Young Lee, Daejeon (KR);
Jun-Yeob Seong, Daejeon (KR);
Young-Sop Eom, Daejeon (KR);
Gang-U Lee, Daejeon (KR); Dal-Mo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/316,432

(22) PCT Filed: Dec. 18, 2015

(86) PCT No.: PCT/KR2015/013976
§ 371 (c)(1),
(2) Date: Dec. 5, 2016

(87) PCT Pub. No.: WO2017/104877
PCT Pub. Date: Jun. 22, 2017

(65) Prior Publication Data
US 2018/0040932 A1      Feb. 8, 2018

(51) Int. Cl.
*H01M 10/6556*     (2014.01)
*H01M 2/10*     (2006.01)
(Continued)

(52) U.S. Cl.
CPC ......... *H01M 10/6556* (2015.04); *B60L 50/50* (2019.02); *H01M 2/04* (2013.01);
(Continued)

(58) Field of Classification Search
CPC ............. B60L 11/1874; H01M 10/613; H01M 10/625; H01M 10/6556; H01M 2220/20; H01M 2/04; H01M 2/1077
See application file for complete search history.

(56) References Cited

U.S. PATENT DOCUMENTS 8,252,452 B2    8/2012  Yoon et al.
9,023,503 B2    5/2015  Seong et al.
(Continued)

FOREIGN PATENT DOCUMENTS

CN    204885299 U    12/2015
EP    2 725 650 A2    4/2015
(Continued)

OTHER PUBLICATIONS

International Search Report issued in PCT/KR2015/013976 (PCT/ISA/210), dated Aug. 30, 2016.
(Continued)

*Primary Examiner* — Stewart A Fraser
*Assistant Examiner* — Victoria H Lynch
(74) *Attorney, Agent, or Firm* — Birch, Stewart, Kolasch & Birch, LLP (57) ABSTRACT

Disclosed is a battery module which has a simple structure, small volume and weight, and efficient cooling performance. The battery module includes a plurality of secondary batteries, each including an electrode assembly and a pouch exterior configured to accommodate the electrode assembly in an inner space thereof and having a sealing portion provided thereto, the plurality of secondary batteries being arranged in a vertical direction in a state of being laid in a horizontal direction; and a plurality of cartridges configured to be stacked in a vertical direction, each cartridge being coupled in contact with a sealing portion of the secondary battery to surround the sealing portion and being made of thermally-conductive material.

13 Claims, 7 Drawing Sheets

(51) Int. Cl.
*H01M 10/625* (2014.01)
*H01M 10/613* (2014.01)
*H01M 10/04* (2006.01)
*H01M 10/647* (2014.01)
*B60L 50/50* (2019.01)
*H01M 2/04* (2006.01)
*H01M 10/6561* (2014.01)
*H01M 10/653* (2014.01)
*H01M 10/48* (2006.01)
*H01M 10/6567* (2014.01)
*B60L 58/26* (2019.01)

(52) U.S. Cl.
CPC ..... *H01M 2/1077* (2013.01); *H01M 10/0413* (2013.01); *H01M 10/613* (2015.04); *H01M 10/625* (2015.04); *H01M 10/647* (2015.04); *B60L 58/26* (2019.02); *H01M 10/482* (2013.01); *H01M 10/653* (2015.04); *H01M 10/6561* (2015.04); *H01M 10/6567* (2015.04); *H01M 2220/20* (2013.01); *Y10S 903/907* (2013.01)

(56) References Cited

U.S. PATENT DOCUMENTS

| | | | | |
|---|---|---|---|---|
| 2006/0251960 A1* | 11/2006 | Yoon | ................ | H01M 2/0245 429/120 |
| 2009/0311581 A1* | 12/2009 | Park | ................ | H01M 2/0237 429/62 |
| 2010/0136420 A1* | 6/2010 | Shin | ................ | H01M 2/1077 429/178 |
| 2010/0273044 A1* | 10/2010 | Culver | ................ | H01M 2/24 429/160 |
| 2013/0313754 A1* | 11/2013 | Heckenberger | ..... | H01M 2/0262 264/328.17 |
| 2015/0093608 A1* | 4/2015 | Seong | ................ | H01M 2/0267 429/56 |
| 2016/0233465 A1 | 8/2016 | Lee et al. | | |

FOREIGN PATENT DOCUMENTS

| | | | |
|---|---|---|---|
| EP | 2 860 787 A1 | 4/2015 | |
| JP | 2008-541347 A | 11/2008 | |
| KR | 10-1217608 B1 | 1/2013 | |
| KR | 10-2013-0062543 A | 6/2013 | |
| KR | 10-2013-0073582 A | 7/2013 | |
| KR | 10-2013-0125341 A | 11/2013 | |
| KR | 10-1413831 B1 | 7/2014 | |
| WO | WO-2014027783 A1 * | 2/2014 | .......... H01M 2/0267 |

OTHER PUBLICATIONS

Written Opinion of the International Searching Authority issued in PCT/KR2015/013976 (PCT/ISA/237), dated Aug. 30, 2016.

* cited by examiner

BATTERY MODULE

TECHNICAL FIELD

The present disclosure relates to a battery including at least one secondary battery, and more particularly, to a battery module which has a simple structure, small volume and weight, and efficient cooling performance, and a battery pack and a vehicle including the battery module.

BACKGROUND ART

Currently, nickel-cadmium batteries, nickel-metal hydride batteries, nickel-zinc batteries, lithium secondary batteries, and the like are used as commercial secondary batteries. Among them, lithium secondary batteries have little to no memory effect in comparison with nickel-based secondary batteries, and thus lithium secondary batteries are gaining a lot of attention for their advantages of free charging or discharging, low self-discharging, and high energy density.

A lithium secondary battery generally uses lithium oxide and carbonaceous material as a positive electrode active material and negative electrode active material, respectively. The lithium secondary battery includes an electrode assembly in which a positive electrode plate and a negative electrode plate respectively coated with the positive electrode active material and the negative electrode active material are disposed with a separator being interposed between them, and an exterior, namely a battery case, which seals and accommodates the electrode assembly together with an electrolyte.

Generally, a lithium secondary battery may be classified into a can-type secondary battery where the electrode assembly is included in a metal can and a pouch-type battery where the electrode assembly is included in a pouch of an aluminum laminate sheet, depending on the shape of the exterior.

Recently, secondary batteries are widely used not only for small-sized devices such as cellular phones but also middle-sized or large-sized devices such as vehicles and power storages. When being used for middle-sized or large-sized devices, a great number of secondary batteries are electrically connected to enhance capacity and output. In particular, in middle-sized or large-sized devices, pouch-type secondary batteries are frequently used since they can be easily stacked and have light weight.

However, a pouch-type secondary battery does not have great mechanical rigidity and may not easily maintain its stacked state by itself since it is generally packaged with a battery case made of a laminate sheet of aluminum and polymer. Therefore, when configuring a battery module including a plurality of pouch-type secondary batteries, a cartridge is frequently used to protect the secondary batteries from external impacts or the like, prevent fluctuation of the secondary batteries and facilitate easier stacking of the secondary batteries.

The cartridge frequently has a tetragonal plate shape with a hollow center, and at this time four sides are provided to surround the outer circumference of the pouch-type secondary battery. In addition, a plurality of cartridges may be stacked to configure a battery module, and a secondary battery may be located in a vacuum space formed among the stacked cartridge.

Generally, a battery pack is frequently cooled in various ways, for example direct or indirect water or air cooling. In particular, in case of an existing battery pack, in order to remove heat emitted during a charging or discharging process, a plurality of cooling members made of metal material is disposed around a secondary battery, and a cooling medium such as air or water is supplied around the cooling member. For example, in an existing technique, in many cases, a metallic cooling member such as a cell cover or a cooling plate for the flow or thermal conduction of the cooling medium is interposed between secondary batteries.

However, if the cooling member or a channel for the flow of a cooling medium is provided between secondary batteries, the battery module inevitably has increased volume and weight as a whole and also has a complicated structure. Therefore, the battery module has deteriorated efficiency in fabrication, also has a limit in miniaturization, and also has an increased fabrication time and cost.

Further, since the cooling member is generally made of electrically-conductive metal, when a cooling member is provided to the battery module, insulation against a battery cell should be put into consideration. Therefore, the battery module may have more complicated structure due to a configuration for the insulation, and its volume and cost may also be increased.

DISCLOSURE

Technical Problem

The present disclosure is designed to solve the problems of the related art, and therefore the present disclosure is directed to providing a battery module, which may have a simple structure as well as small volume and weight and ensure excellent assembling and efficient cooling performance, and a battery pack and a vehicle including the battery module.

Other objects and advantages of the present disclosure will be understood from the following descriptions and become apparent by the embodiments of the present disclosure. In addition, it is understood that the objects and advantages of the present disclosure may be implemented by components defined in the appended claims or their combinations.

Technical Solution

In one aspect of the present disclosure, there is provided a battery module, comprising: a plurality of secondary batteries, each including an electrode assembly and a pouch exterior configured to accommodate the electrode assembly in an inner space thereof and having a sealing portion provided thereto, the plurality of secondary batteries being arranged in a vertical direction in a state of being laid in a horizontal direction; and a plurality of cartridges configured to be stacked in a vertical direction, each cartridge being coupled in contact with a sealing portion of the secondary battery to surround the sealing portion and being made of thermally-conductive material.

Here, at least a part of the cartridge may include a thermally-conductive polymer or include a thermally-conductive material containing thermally-conductive filler and polymer.

In addition, the cartridge may be made of the same material as a whole.

In addition, the cartridge may have a tetragonal ring shape, when being observed downwards from the above and be configured to surround a periphery of the accommodation space of the electrode assembly in state of contacting an outer side of the accommodation space at the pouch exterior.

In addition, the cartridge may be formed by insert molding to be coupled in contact with the sealing portion of the secondary battery.

In addition, the battery module may have at least one vertical sectional pattern in which a cartridge and a secondary battery adjacently stacked in a vertical direction come into continuous contact with each other from a left end to a right end thereof.

In addition, the cartridge may have a plurality of coupling protrusions having a hook shape and a plurality of coupling grooves into which the coupling protrusions are inserted, formed at an outer circumference thereof with shapes corresponding to each other.

In addition, the battery module may further include an outer cover configured to cover an upper or lower portion of a secondary battery and a cartridge located at an uppermost or lowermost location and made of thermally-conductive material.

In addition, the outer cover may have a concave portion formed in a lattice pattern at an outer surface thereof.

In addition, the battery module according to the present disclosure may further include a sensing cover configured to sense a voltage of the secondary battery, give an electrode terminal of the battery module, and cover an electrode lead of the secondary battery at an outer side.

In addition, the battery module according to the present disclosure may further include outer covers respectively provided at upper and lower portions of the battery module, and the sensing cover may extend toward the outer covers so that upper and lower ends of the sensing cover respectively cover a part of upper and lower portions of the outer covers, and the extended portion of the sensing cover may be fixed to the outer covers.

In addition, the battery module according to the present disclosure may further include a cooling medium supply unit configured to supply a cooling medium so that the cooling medium flows at an outer side of the cartridge.

In another aspect of the present disclosure, there is also provided a battery pack, which includes the battery module according to the present disclosure.

In another aspect of the present disclosure, there is also provided a vehicle, which includes the battery module for a secondary battery according to the present disclosure.

Advantageous Effects

In one aspect of the present disclosure, the cartridge is made of thermally-conductive material, and the secondary battery is coupled in contact with the cartridge.

Therefore, in this aspect of the present disclosure, the cartridge for fixing the secondary battery may also play a role of cooling the secondary battery, and thus it is not needed to separately provide a cooling member for absorbing heat from the secondary battery and transferring to outside, between secondary batteries, in addition to the cartridge.

In addition, this aspect of the present disclosure, since the heat of the secondary battery may be directly emitted in a lateral direction through the cartridge, it is not needed to separately provide a channel for the passage of an air or the like, between secondary batteries.

Therefore, in this aspect of the present disclosure, it is possible to provide a battery module, which has a simple structure as well as small volume and weight and ensures efficient cooling performance. In addition, since a cooling member may not be provided between secondary batteries, it is not needed to provide any configuration for insulating them.

In addition, in one aspect of the present disclosure, the cartridge may be integrally coupled to the secondary battery by means of insert molding.

Therefore, in this aspect of the present disclosure, when a plurality of secondary batteries and cartridges are stacked to assemble a battery module, if secondary batteries are stacked, this means that cartridges are stacked, thereby ensuring easy assembling.

For this reason, in this aspect of the present disclosure, the battery module may be fabricated in a better way to reduce fabrication time and cost and a fraction defective, thereby improving productivity.

Further, in one aspect of the present disclosure, since spaces between a cartridge and a secondary battery, between a secondary battery and a secondary battery, and between a cartridge and a cartridge are reduced, the battery module may have a decreased size. In addition, since the battery module may have no air layer or a minimized air layer in the inner space, it is possible to prevent heat transfer from being disturbed by the air layer.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
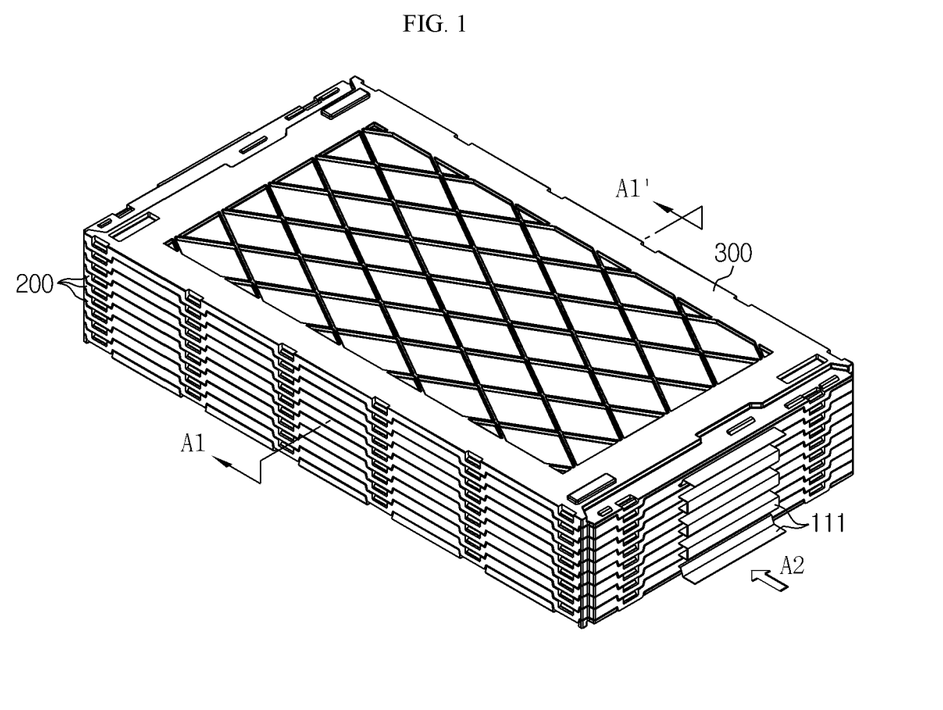
FIG. 1 is a perspective view schematically showing a battery module according to an embodiment of the present disclosure.

FIG. 1 is a perspective view schematically showing a battery module according to an embodiment of the present disclosure. Also, FIG. 2 is an exploded perspective view showing a partial portion of the battery module of FIG. 1.

Figure 2:
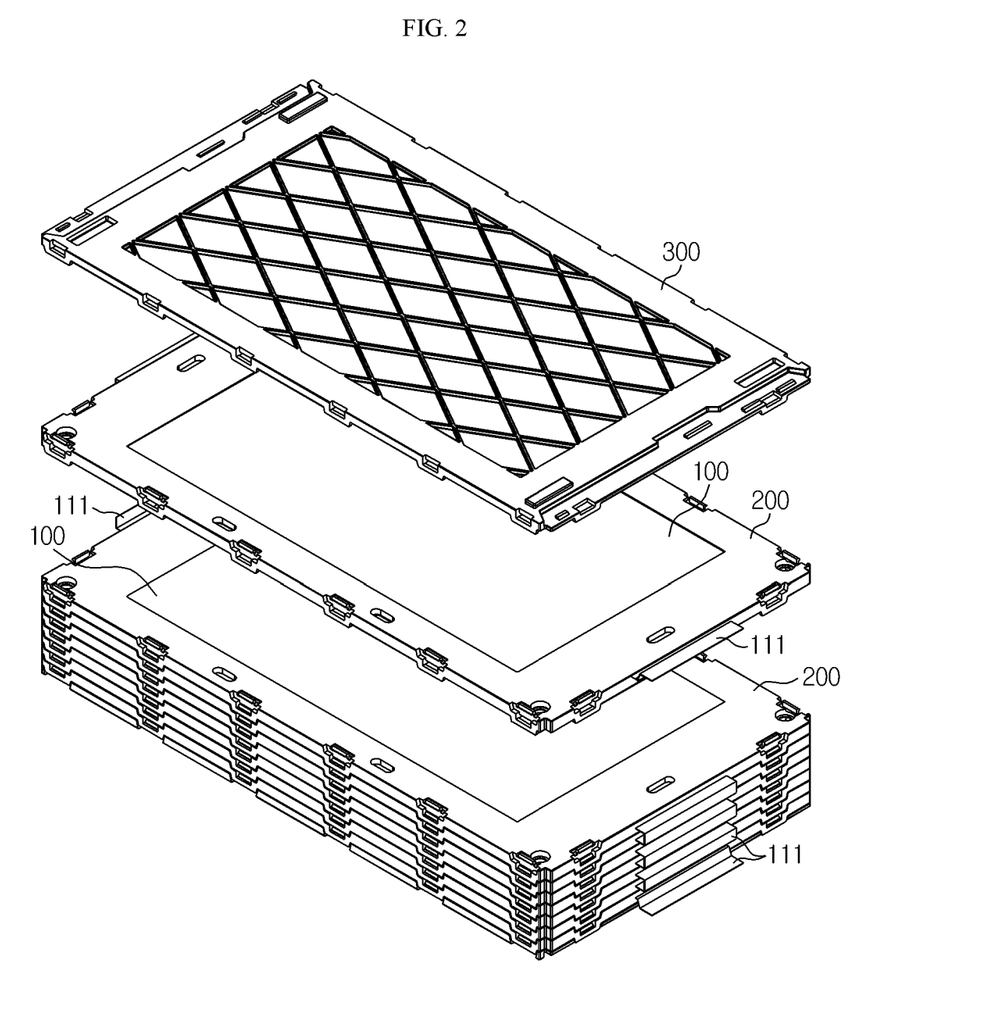
FIG. 2 is an exploded perspective view showing a partial portion of the battery module of FIG. 1.

Referring to FIGS. 1 and 2, a battery module according to the present disclosure includes a secondary battery 100 and a cartridge 200.

Here, the secondary battery 100 may include an electrode assembly and a pouch exterior The electrode assembly may be configured so that at least one positive electrode plate and at least one negative electrode plate are arranged with a separator being interposed therebetween. This configuration of the electrode assembly is obvious to those skilled in the art and thus not described in detail here.

The secondary battery 100 may be classified into a can-type secondary battery and a pouch-type secondary battery, depending on the material of the case, and the battery module according to the present disclosure may adopt a pouch-type secondary battery. The pouch-type secondary battery may include a pouch exterior as a case. In addition, the pouch exterior may be configured to have an outer insulation layer, a metal layer and an inner adhesive layer.

Figure 3:
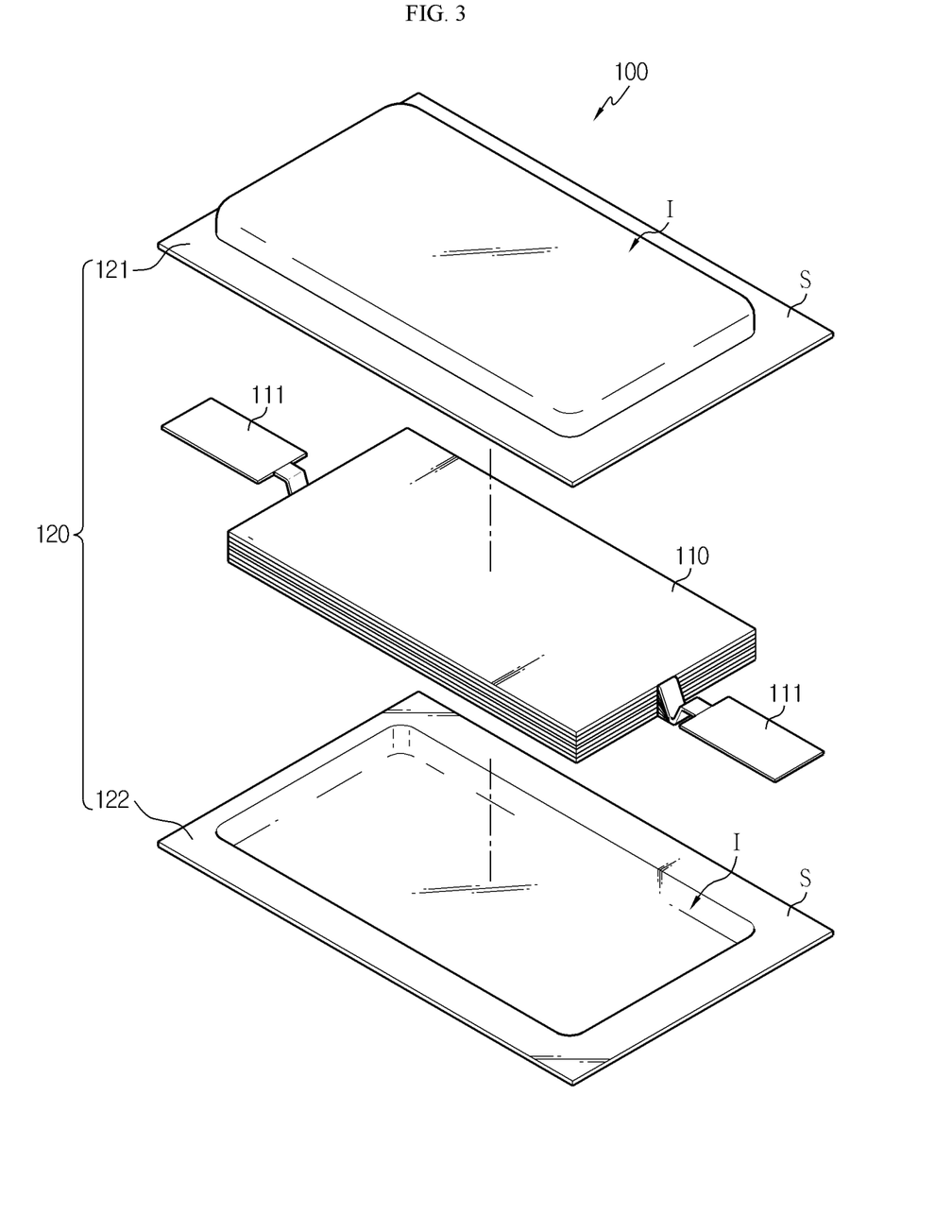
FIG. 3 is an exploded perspective view schematically showing a pouch-type secondary battery according to an embodiment of the present disclosure.
Figure 4:
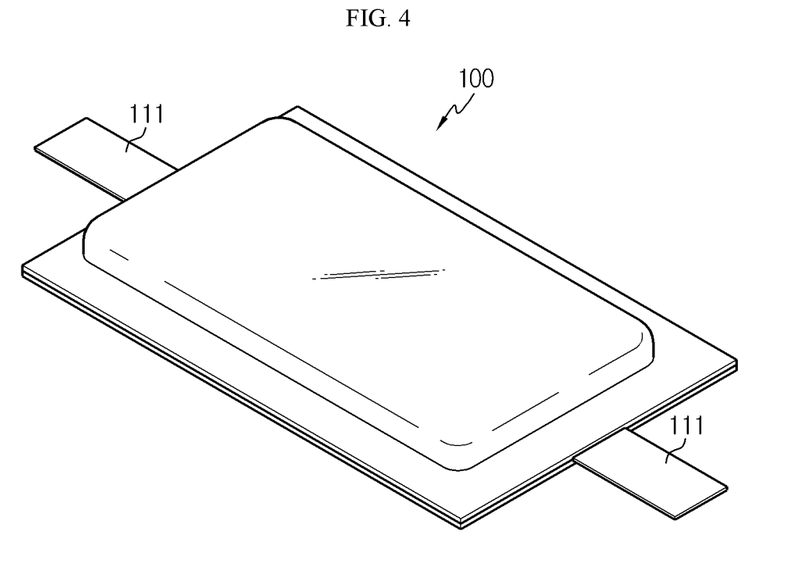
FIG. 4 is a perspective view showing the pouch-type secondary battery of FIG. 3 in an assembled state.

FIG. 3 is an exploded perspective view schematically showing a pouch-type secondary battery 100 according to an embodiment of the present disclosure, and FIG. 4 is a perspective view showing the pouch-type secondary battery of FIG. 3 in an assembled state.

Referring to FIGS. 3 and 4, in the pouch-type secondary battery 100, the pouch exterior 120 may be composed of an upper pouch 121 and a lower pouch 122. In addition, in at least one of the upper pouch 121 and the lower pouch 122, as indicated by "I", a concave inner space, namely an accommodation space, may be formed. In addition, in the inner space of the pouch exterior 120, an electrode assembly 110 and an electrolyte may be accommodated.

In addition, as indicated by "S", the pouch exterior 120 of the secondary battery 100 may have a sealing portion formed by sealing its rim portion which surrounds the accommodation space of the electrode assembly 110. In other words, the upper pouch 121 and the lower pouch 122 may be adhered to each other by thermally bonding their inner adhesive layers at the sealing portion, thereby sealing the inner space.

In addition, an electrode tab may be provided to each electrode plate of the electrode assembly 110, and at least one electrode tab may be connected to an electrode lead 111. Moreover, the electrode lead 111 may be interposed between rim portions of the upper pouch 121 and the lower pouch 122, namely sealing portions thereof, and exposed out of the pouches, thereby serving as an electrode terminal of the secondary battery 100.

A plurality of pouch-type secondary batteries 100 may be included in a battery module. In addition, the pouch-type secondary batteries 100 may be arranged in a vertical direction in a state where each pouch-type secondary battery is laid in a horizontal direction. In other words, the pouch-type secondary battery 100 may be formed with an approximately plate shape having two broad surfaces, which face upper and lower directions, and its sealed rim portion may be located at a circumferential portion of the accommodation space in a horizontal direction. In other words, the secondary battery 100 may be laid in a horizontal direction so that the upper pouch 121 and the lower pouch 122 of the secondary battery 100 are respectively located at upper and lower sides. In this case, a plurality of secondary batteries 100 may be stacked in a vertical direction so that adjacent secondary batteries 100 face each other on their surfaces.

Meanwhile, in the present disclosure, for convenience, upper, lower, front, rear, right and left directions are defined so that a portion where the electrode lead 111 protrudes is a front or rear direction, and the right and left directions are determined based on the electrode lead 111. In other words, in the battery module of FIG. 1, based on the fact that the battery module is observed from a location where the electrode lead 111 is depicted, in other words, based on the fact that the battery module is observed in a direction indicated by an arrow A2, a just front portion where the electrode lead 111 is defined as a front direction of the battery module, and sides located at right and left portions are respectively defined as right and left sides of the battery module. In addition, the electrode lead 111 may also be provided at a side opposite to the arrow A2, and in the corresponding portion, a rear side may be defined as an opposite side to the front side. Hereinafter, the directions are defined as above, unless otherwise stated.

The cartridge 200 may be located at the sealing portion of the pouch-type secondary battery 100 to surround the sealing portion. The configuration of the cartridge 200 will be described later in more detail with reference to FIGS. 5 and 6.

Figure 5:
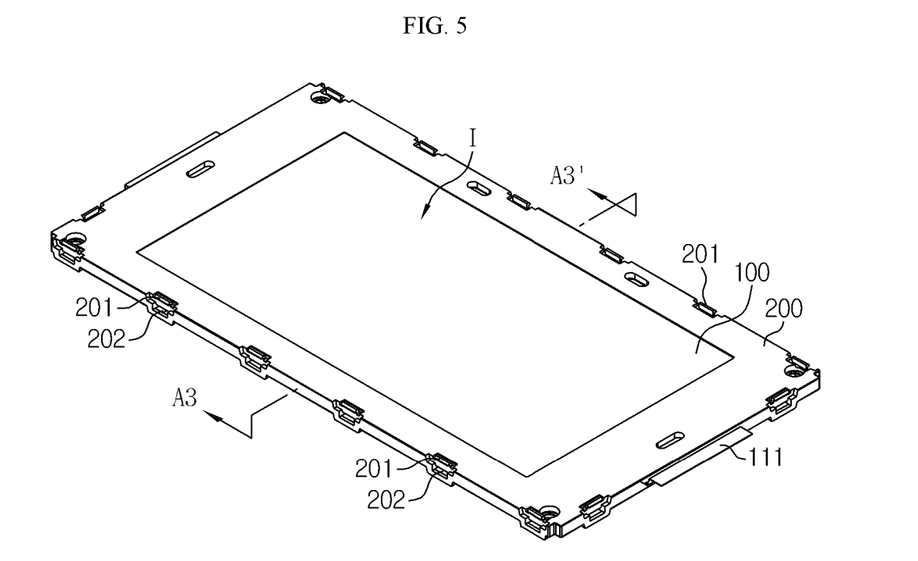
FIG. 5 is a perspective view schematically showing a secondary battery and a cartridge according to an embodiment of the present disclosure.
Figure 6:
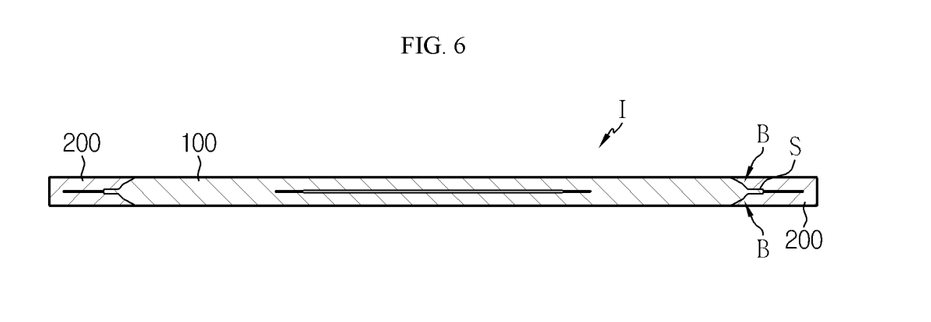
FIG. 6 is a cross-sectional view taken along the line A3-A3' of FIG. 5.

FIG. 5 is a perspective view schematically showing a secondary battery 100 and a cartridge 200 according to an embodiment of the present disclosure, and FIG. 6 is a cross-sectional view taken along the line A3-A3' of FIG. 5.

First, referring to FIG. 5, the cartridge 200 may be configured to surround a periphery of the accommodation space I in which the electrode assembly 110 is accommodated at the pouch exterior 120. In other words, on the plane view, the sealing portion of the secondary battery 100 may be located along the periphery of the accommodation space I of the electrode assembly 110, and the cartridge 200 may also be located at the periphery of the accommodation space I of the electrode assembly 110, similar to the sealing portion. In this case, when the secondary battery 100 in a laid state is observed downwards from the above, the cartridge 200 is located in a portion except for the accommodation space I at the center and thus may have an approximately ring shape.

In particular, as shown in FIG. 5, the pouch-type secondary battery 100 may have a tetragonal shape in its laid state, when being observed downwards from the above. Therefore, the cartridge 200 may be located along the sealing portion of the secondary battery 100 to have a tetragonal ring shape.

In addition, referring to FIG. 6, the cartridge 200 may be configured to surround the sealing portion of the secondary battery 100 at an outer side. In other words, the cartridge 200 may contact the upper, lower and side portions of the sealing portion to surround the same and be fixed thereto.

In particular, the cartridge 200 may be configured to contact an outer side of the accommodation space of the electrode assembly 110 at the pouch exterior 120. Here, the side of the accommodation space may means a side portion in a horizontal direction which protrudes convexly so that the electrode assembly 110 is accommodated at the pouch exterior 120. In other words, in the pouch-type secondary battery 100, a step is present between the sealing portion S and the accommodation space I which accommodates the electrode assembly 110 at the pouch exterior 120, and thus, as indicated by B in FIG. 6, an inclined surface may exist between the accommodation space I and the sealing portion S. At this time, the cartridge 200 may be configured to be coupled to the pouch exterior 120 in state of contacting the outer inclined surface of the accommodation space I. In other words, the cartridge 200 may be configured to coat all of the sealing portion of the pouch exterior 120 and the inclined surface.

In this configuration of the present disclosure, a contact area between the cartridge 200 and the secondary battery 100 is great, and thus heat transfer efficiency between the secondary battery 100 and the cartridge 200 may be enhanced. In other words, the heat generated from the secondary battery 100 may be directly conducted to the cartridge 200 through not only the sealing portion of the pouch exterior 120 but also the inclined surface, and since an air layer is not interposed in such a heat transfer path, it is possible to prevent heat resistance from occurring due to the air layer. Therefore, in this case, a heat transfer rate and a heat transfer amount between the secondary battery 100 and the cartridge 200 may be enhanced, and thus cooling performance using the cartridge 200 may be further improved.

Preferably, the cartridge 200 may be coupled to the sealing portion of the secondary battery 100 by means of insert molding. In other words, the cartridge 200 may be integrally formed with the sealing portion by supplying a resin to coat the sealing portion of the secondary battery 100 in a state where the pouch-type secondary battery 100 is inserted in a mold.

In this configuration of the present disclosure, since the cartridge 200 is present in a state of being fixed to the secondary battery 100, the battery module may be assembled more efficiently. In other words, in this configuration of the present disclosure, when a plurality of secondary batteries 100 and cartridges 200 are stacked to configure a battery module, the secondary batteries 100 and the cartridges 200 may not be stacked separately, but the cartridges 200 and the secondary batteries 100 may be stacked simultaneously just with a single stacking process In addition, in this configuration of the present disclosure, it is possible to prevent the secondary battery 100 from being shaken, and a space between the cartridge 200 and the secondary battery 100 may be reduced, which decrease an overall volume of the battery module. Moreover, in this configuration of the present disclosure, a distance between the cartridge 200 and the secondary battery 100 decreases, and thus heat transfer efficiency from the secondary battery 100 to the cartridge 200 may be improved. Further, in the battery module of the present disclosure, since the cartridge 200 is made of thermally-conductive material as described later, the improvement of heat transfer efficiency may be more effectively accomplished.

In the battery module of the present disclosure, the cartridge 200 may be made of thermally-conductive material. An existing cartridge is generally made of polymer material without thermal conduction, and thus a cooling member is separately provided in many cases since thermal conduction is substantially not performed through the cartridge. However, in the cartridge 200 included in the battery module according to the present disclosure, since the cartridge is at least partially made of thermally-conductive material from its inner side to its outer side, heat of the secondary battery 100 may be easily transferred out of the cartridge 200 through the thermally-conductive material portion of the cartridge 200. Therefore, in the embodiment of the present disclosure, effective cooling performance may be ensured though a cooling member is not separately provided in the cartridge 200 between secondary batteries 100.

In particular, at least a part of the cartridge 200 may include a thermally-conductive polymer or may be made of a thermally-conductive material containing thermally-conductive filler and polymer. In other words, the cartridge 200 may be made using a polymer as a main material, instead of general metal or metal alloy. The polymer-based thermally-conductive material is lighter than metal, which allows the battery module to easily have a lighter design, ensures easy molding, low thermal expansion coefficient and low electric conduction, which leads to better electric insulation. In the present disclosure, the material of the cartridge 200 may adopt various kinds of polymer-based thermally-conductive materials known to the public at the time of filing of the present disclosure.

For example, the cartridge 200 may be made of a composite material in which a general polymer is mixed with thermally-conductive fillers. Here, the filler may include silicon compound, aluminum compound, magnesium compound, boron compound or the like. For example, the filler included in the thermally-conductive material may employ silicon oxide, aluminum oxide, boron nitride, aluminum nitride, magnesium oxide, anhydrous magnesium carbonate, magnesium hydroxide or the like. However, the present disclosure is not limited thereto, and various fillers other than the above may also be used as a material of the cartridge 200.

The polymer used in the cartridge 200 may include various materials such as polypropylene, acrylonitrile butadiene styrene, polycarbonate, nylon, liquid crystal polymer, polyphenylene sulfide, polyetherether ketone or the like. In addition, various polymer materials other than the above may also be used as a material of the cartridge 200 of the present disclosure.

In particular, the thermally-conductive material of the cartridge 200 may have heat conductivity of 1 W/mK or above. For example, this thermally-conductive material may be polymer plastic with 2 W/mK to 20 W/mK. Further, the thermally-conductive material may be polymer plastic with 5 W/mK or above.

In an existing technique, plastic used as a material of a cartridge generally has thermal conductivity of just 0.1 W/mK to 0.4 W/mK. However, since the cartridge 200 according to the present disclosure uses a polymer material having higher thermal conductivity, the cartridge may allow heat transfer and emission. Therefore, in this embodiment of the present disclosure, even though a cooling member such as a metallic cooling plate is not separately provided in the cartridge, heat of the secondary battery 100 may be effectively transferred to the outside through the cartridge 200.

Further, in an aspect of the present disclosure, since the cartridge 200 is coupled to the secondary battery 100 by means of insert molding, the heat of the secondary battery 100 may be transferred directly to the cartridge 200 without passing through an air layer. In addition, since the cartridge 200 is made of thermally-conductive material, the heat transferred to the cartridge 200 may be discharged out of the battery module through the cartridge 200.

Preferably, the cartridge 200 may be made of the same material as a whole. In other words, in the configuration depicted in FIGS. 5 and 6, a single cartridge 200 may be made of the same kind of thermally-conductive material as a whole. For example, the cartridge 200 may be made of the same kind of thermally-conductive polymer as a whole or made of the same kind of thermally-conductive filler and polymer as a whole.

In this configuration of the present disclosure, the cartridge 200 may be provided at the sealing portion of the secondary battery 100 more easily by means of insert molding. For example, a single cartridge 200 may be entirely formed just by injecting a single molten material into a mold, and thus the cartridge 200 may be fabricated easily within a shorter time.

Figure 7:
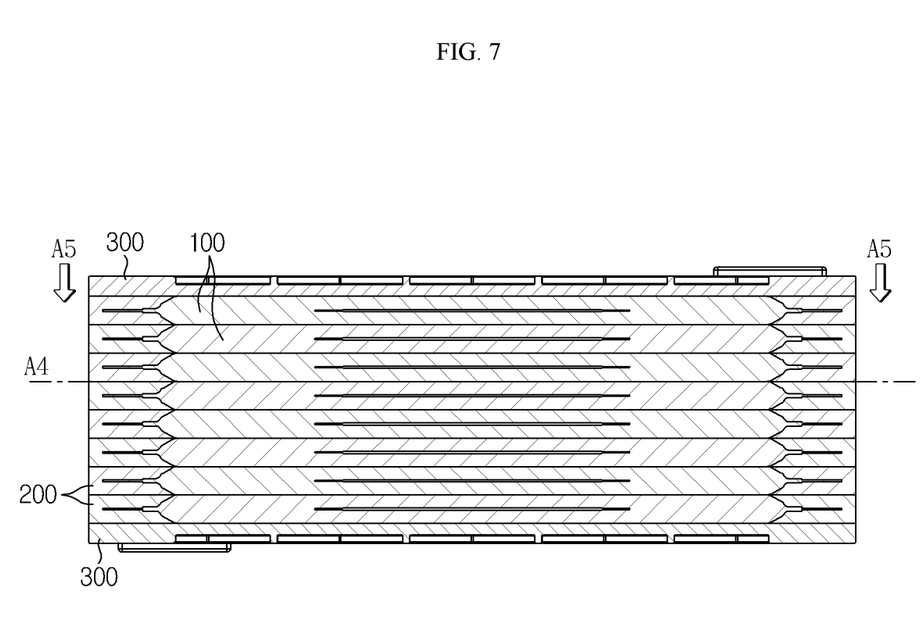
FIG. 7 is a vertical sectional view showing a battery module according to an embodiment of the present disclosure.

FIG. 7 is a vertical sectional view showing a battery module according to an embodiment of the present disclosure. For example, FIG. 7 may be regarded as a sectional view taken along the line A1-A1' of FIG. 1.

FIG. 7 depicts a vertical sectional view in which a battery module is cut in a stacking direction, and a plurality of cartridges 200 and a plurality of secondary batteries 100 of the same kind are stacked in a vertical direction.

Here, the battery module according to the present disclosure may be configured so that, with respect to at least one vertical section, a cartridge 200 and a secondary battery 100 stacked adjacent to each other may come into contact with each other continuously from a left end to a right end thereof.

In other words, upper and lower portions of each cartridge 200 may entirely come into contact with cartridges 200 stacked adjacently, and upper and lower portions of each secondary battery 100 may also entirely contact with secondary batteries 100 stacked adjacently. For example, based on the line A4 of FIG. 7, a lower portion of a cartridge 200 and a secondary battery 100 located at a third location from the top may come into contact with an upper portion of a cartridge 200 and a secondary battery 100 located at a fourth location from the top continuously from a left end to a right end.

In particular, the cartridges 200 and the secondary batteries 100 may be configured to come into contact with each other in a vertical direction based on one straight line. For this, the cartridge 200 may have approximately flat upper and lower portions, and its height in a vertical direction may be substantially identical to the height of the secondary battery 100. In addition, the secondary battery 100 may be configured so that the accommodation space of the electrode assembly 110 has flat upper and lower portions.

In addition, the continuous contact between the cartridge 200 and the secondary battery 100 may also be applied to the other cartridges 200 and secondary batteries 100.

In the configuration of the present disclosure, heat may be transferred from the secondary battery 100 to the cartridge 200 more efficiently. In other words, in an aspect of the present disclosure, the heat emitted from the secondary battery 100 may be transferred to the cartridge 200 in a direction horizontal to the ground, and if secondary batteries 100 stacked vertically and cartridges 200 stacked vertically come into entire contact with each other, an air layer may not be formed in a heat transfer path. Therefore, it is possible to reduce that the heat transfer is disturbed by an air layer, and thus cooling performance may be stably ensured.

In addition, in this configuration of the present disclosure, since a contact area between the secondary batteries 100 and between the cartridges 200 increases, heat transfer efficiency may be improved between them. For example, when heat is generated from a specific secondary battery 100, the heat may be easily transferred not only to a cartridge 200 fixed to the corresponding secondary battery 100 but also to other secondary batteries 100 and other cartridges 200. Therefore, since heat may also be discharged through other secondary batteries 100 and other cartridges 200, there are provided more heat discharge paths, thereby improving overall cooling performance.

Moreover, in this configuration of the present disclosure, since the space between the secondary battery 100 and the cartridge 200 is eliminated or narrowed, the battery module may have a reduced size.

The cartridges 200 may be configured to be stacked with each other in a vertical direction. For this, the cartridge 200 may have flat surfaces or corresponding surface shapes so that other cartridges 200 may be stacked on upper and lower portions thereof.

In particular, the cartridge 200 may have a coupling protrusion 201 and a coupling groove 202 formed on an outer circumference thereof with corresponding shapes.

For example, referring to FIG. 5, the cartridge 200 may have a tetragonal ring shape with two long sides and two short sides. Here, six coupling protrusions 201 and six coupling grooves 202 are formed at each long side, and two coupling protrusions 201 and two coupling grooves 202 are formed at each short side. Here, the coupling protrusion 201 may have a hook shape, and the coupling groove 202 may have a hole shape corresponding to the hook shape. In addition, the coupling protrusion 201 may protrude upwards on the upper surface of the cartridge 200 so that the hooking portion protrudes outwards, namely in a horizontal direction. In addition, the coupling groove 202 may be formed to pass through the side of the cartridge 200 in a horizontal direction.

In particular, the coupling protrusion 201 and the coupling groove 202 may be located at an outer circumference, namely a side surface, of the cartridge 200. In this case, it is possible to prevent the cartridge 200 from having an increased size to form a coupling configuration such as the coupling protrusion 201 and the coupling groove 202.

When the cartridges 200 are stacked in a vertical direction, the coupling protrusions 201 and the coupling grooves 202 may be coupled with coupling protrusions 201 and coupling grooves 202 of other cartridges 200 located at upper and lower portions, so that the cartridges 200 and the secondary batteries 100 may be fixed to each other. In addition, in this configuration, the battery module according to the present disclosure may not separately include a bolt coupling unit or the like for fixing the cartridges 200 with each other. Therefore, by doing so, a production cost of the battery module may be lowered, a fabricating process may be simplified, and a weight of the battery module may be reduced.

Also preferably, the battery module according to the present disclosure may further include an outer cover 300 as shown in the figures.

Referring to FIGS. 1, 2 and 7, the outer cover 300 may be located at an upper and/or lower portion of the battery module to cover the upper and/or lower portion of the battery module. For example, the outer cover 300 may be located at an upper portion of a secondary battery 100 and a cartridge 200 provided at an uppermost location to cover them. In addition, the outer cover 300 may be located at a lower portion of a secondary battery 100 and a cartridge 200 provided at a lowermost location to cover them. Therefore, the outer cover 300 may prevent the secondary batteries 100 located at the uppermost and lowermost locations from being exposed outwards, thereby protecting the secondary battery 100 and the cartridge 200 against external physical or chemical factors of the battery module.

In particular, the outer cover 300 may be made of thermally-conductive material, similar to the cartridge 200. In this case, the outer cover 300 may be made of the same material as the cartridge 200 or another kind of thermally-conductive material. For example, the outer cover 300 may be made of, thermally-conductive polymer, or thermally-conductive filler and polymer.

In this configuration of the present disclosure, the heat generated from the secondary battery 100 may also be discharged not only through the cartridge 200 located at a side but also through the outer cover 300 located at the uppermost and/or lowermost positions, and thus the overall cooling performance of the battery module may be further improved.

The outer cover 300 may have a concave portion formed in a lattice pattern at an outer surface thereof. For example, in case of the outer cover 300 provided at an upper portion, as shown in FIGS. 1 and 2, a concave portion may be formed at an upper surface thereof, and the concave portion may be formed in a lattice pattern.

In this configuration of the present disclosure, the outer cover 300 may be made of polymer material, and it is possible to enhance mechanical strength of the outer cover 300 and also increase a contact area with the external air, so that the cooling performance through the outer cover 300 may be further improved.

Figure 8:
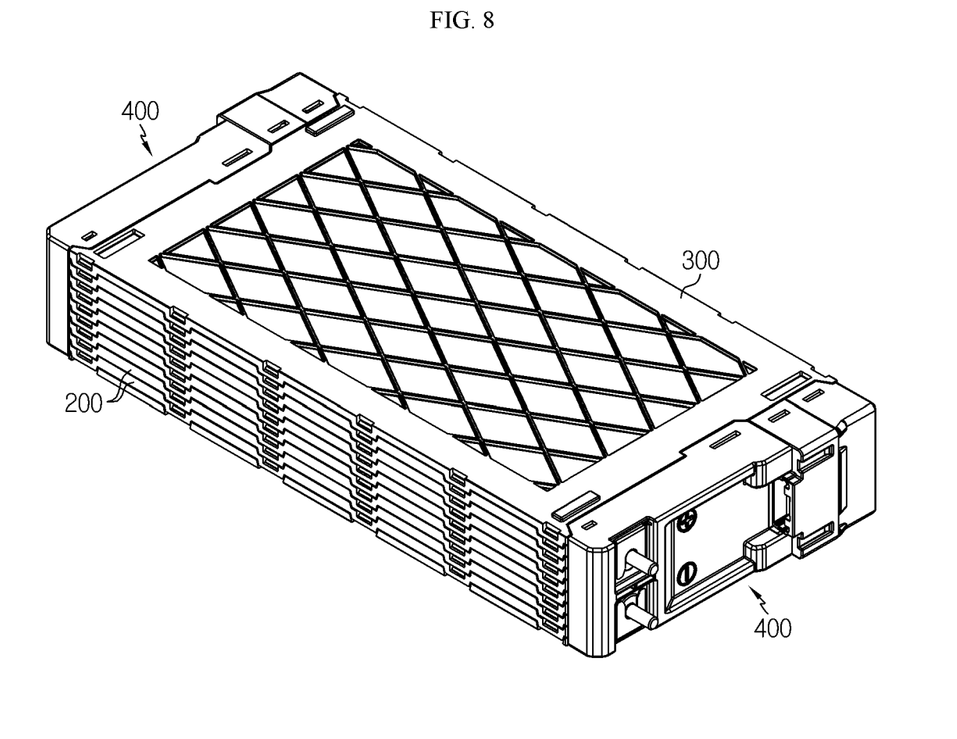
FIG. 8 is a perspective view schematically showing a battery module according to another embodiment of the present disclosure.
Figure 9:
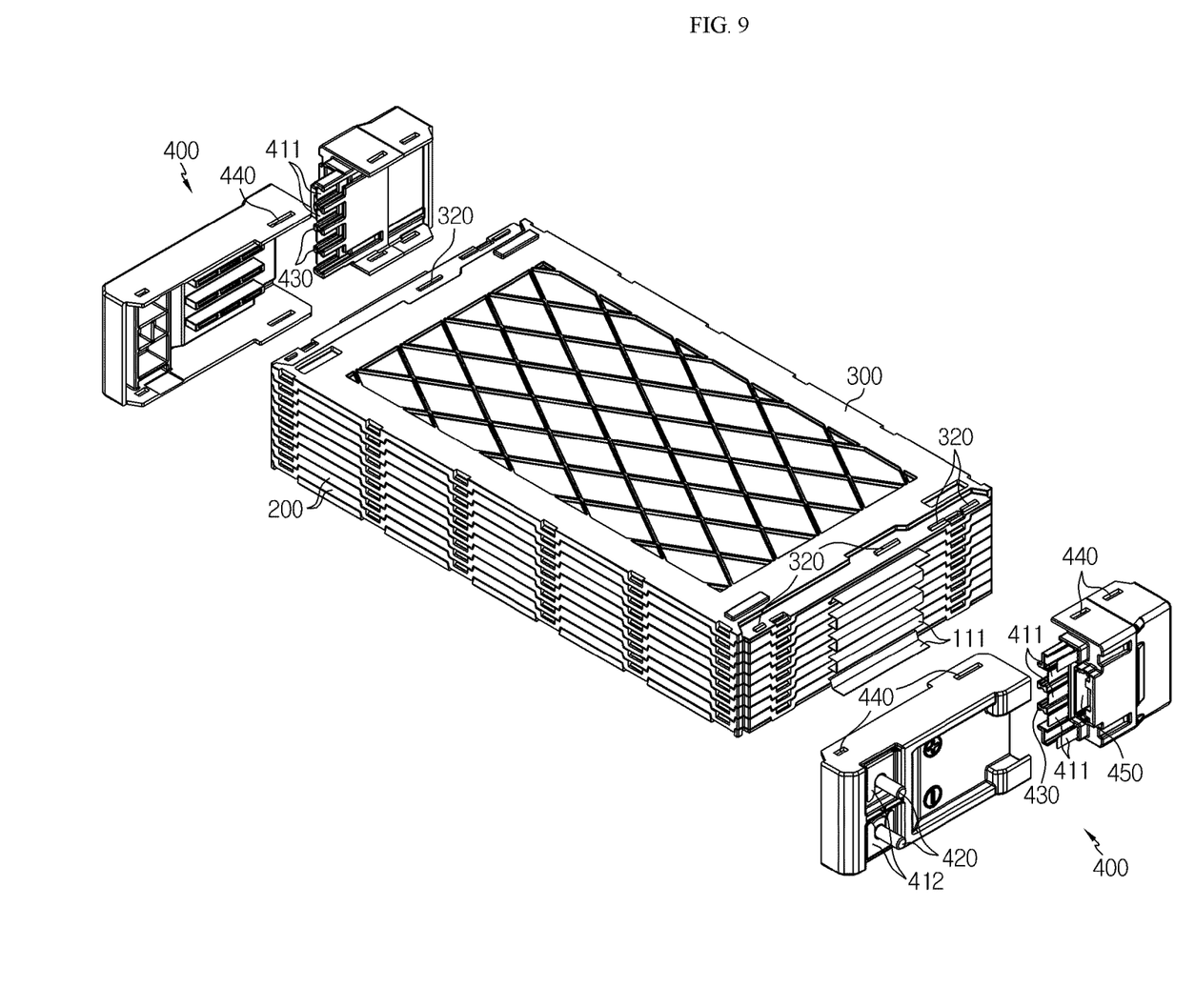
FIG. 9 an exploded perspective view showing a partial portion of the battery module of FIG. 8.

FIG. 8 is a perspective view schematically showing a battery module according to another embodiment of the present disclosure, and FIG. 9 an exploded perspective view showing a partial portion of the battery module of FIG. 8.

Referring to FIGS. 8 and 9, the battery module according to the present disclosure may further include a sensing cover 400.

The sensing cover 400 may be located at a position of the battery module where the electrode lead 111 is provided to protrude thereon, to cover the electrode lead 111 of the secondary battery 100 at an outer side. For example, if the battery module includes a bi-directional secondary battery 100 in which electrode leads 111 are formed to protrude at front and rear sides of the secondary battery 100, the sensing cover 400 may be located at the front and rear sides of the battery module. The sensing cover 400 may protect the electrode lead 111 of the secondary battery 100 against external physical and chemical factors. In particular, the sensing cover 400 may be electrically non-conductive material such as plastic as a whole, except for specific portions such as a bus bar and a connector as explained below, to be electrically insulated from the electrode lead 111, and may prevent the electrode lead 111 of the secondary battery 100 from being exposed out, except for the electrode terminal 420.

In addition, the sensing cover 400 may sense a voltage of the secondary battery 100. For this, the sensing cover 400 may include a sensing bus bar 411 made of metal material to make contact with the electrode lead 111 of the secondary battery 100. In particular, the sensing cover 400 may include a plurality of sensing bus bars 411 so that different sensing bus bars 411 come into contact with different connection portions of the electrode lead 111 of the secondary battery 100. In this case, the sensing cover 400 may sense a voltage of each secondary battery 100.

In addition, the sensing cover 400 may include a connector 450 for the connection to an external device to transmit sensed voltage information to, for example, a battery management system (BMS), so that the sensing bus bar 411 is connected to the connector 450. In this case, the voltage information of the secondary battery 100, sensed by the sensing bus bar 411, is provided to the BMS through a cable connected to the connector 450 and used when a device such as BMS controls charging/discharging of the secondary battery 100.

In addition, the sensing cover 400 may provide an electrode terminal 420 of the battery module. For example, as shown in FIGS. 8 and 9, the sensing cover 400 may include two electrode terminals, namely a positive electrode terminal and a negative electrode terminal, formed to protrude in a front side. The electrode terminal 420 may be used for the connection to another external device, for example a charging or discharging device (load), or to another battery module. In addition, the electrode terminal 420 may be connected to the electrode lead 111 of the secondary battery 100 included in the battery module through a bus bar 412 or the like.

Meanwhile, at least two electrode leads 111 may be connected to each other so that the plurality of secondary batteries 100 included in the battery module are electrically connected to each other in series or in parallel. At this time, the sensing cover 400 may have a seating portion 430 so that the electrode lead 111 directly connected thereto may seat thereon and electrode leads 111 not connected to each other may be physically separated from each other.

The seating portion 430 may be electrically non-conductive material, similar to the body of the sensing cover 400, to prevent electrode leads 111, which should not be connected to each other, from being unintentionally connected to each other, thereby preventing an internal short circuit or the like at the battery module. In addition, since a lower portion of the electrode leads 111 connected to the seating portion 430 may seat thereon to support the electrode lead 111 upwards, the electrode lead 111 and the sensing bus bar 411 may come into stable contact with each other.

In particular, when the outer covers 300 are provided at both the upper and lower portions of the battery module, the sensing cover 400 may extend toward the outer cover 300 so that the upper and lower ends of the sensing cover 400 may cover a part of the upper and lower portions of the outer covers 300 at an outer side. In addition, the sensing cover 400 may be fixed to the outer cover 300 at the extended portion.

For example, as shown in FIG. 9, the sensing cover 400 may be configured so that upper and lower ends thereof are bent to extend toward the center of the battery module in a horizontal direction. In addition, as shown in FIG. 8, when the sensing cover 400 is coupled to the outer cover 300, the extended portion of the sensing cover 400 may be configured to cover the upper portion of the upper outer cover 300 and the lower portion of the lower outer cover 300.

At this time, the outer cover 300 located at the upper portion of the battery module may include at least one cover protrusion 320 formed at a front edge to protrude upwards. In addition, at the top extension of the sensing cover 400, at least one cover hole 440 may be formed at a location corresponding to the cover protrusion 320 with a shape corresponding thereto. Therefore, as shown in FIG. 8, the cover protrusion 320 of the outer cover 300 may be inserted into the cover hole 440 of the sensing cover 400, thereby coupling and fixing the sensing cover 400 and the outer cover 300 to each other.

In this configuration of the present disclosure, the sensing cover 400 may be easily coupled to the outer cover 300. In addition, in this configuration of the present disclosure, the coupling between the sensing cover 400 and the outer cover 300 may be stably maintained, and impurities may not be easily introduced through a space between them.

Meanwhile, as shown in FIG. 9, the outer cover 300 may be configured to have smaller thickness in a region where the top and bottom extensions of the sensing cover 400 are placed, in comparison to other portions. In this configuration, when the sensing cover 400 is coupled to the outer cover 300, it is possible to prevent the entire battery module from having an increased height due to the coupling portion between the sensing cover 400 and the outer cover 300.

The battery module according to the present disclosure may further include a cooling medium supply unit.

The cooling medium supply unit may supply a cooling medium, for example a cooling gas such as air or a cooling liquid such as water, to the battery module. In particular, as shown in FIG. 7, the cooling medium supply unit may allow the cooling medium to flow at right and left sides of the battery module. For this, the cooling medium supply unit may include ducts, pipes, fans, pumps or the like.

In the battery module according to the present disclosure, since the heat may mainly move from the secondary battery 100 to the cartridge 200 in a horizontal direction, the cooling medium may be supplied to an outer side of the cartridge 200, which may be regarded as an end of the battery module in a horizontal direction, to flow therefrom. In this case, all cartridges 200 may directly contact the cooling medium, and thus uniform cooling performance may be stably ensured to the entire secondary battery 100.

A battery pack according to the present disclosure may include at least one battery module as described above. Moreover, the battery pack according to the present disclosure may further include a pack case for receiving the battery module, various devices for controlling charging/discharging of the battery module, for example a battery management system (BMS), a current sensor, a fuse or the like, in addition to the battery module.

The battery module according to the present disclosure may be applied to a vehicle such as an electric vehicle or a hybrid electric vehicle. In other words, the vehicle according to the present disclosure may include the battery module as described above. In particular, in case of a vehicle such as an electric vehicle which obtains a driving force from a battery, the cooling performance is very important along with a small and light design of the battery module. Therefore, if the battery module according to the present disclosure is applied to such a vehicle, it is possible to provide a stable and safe battery module with effective cooling performance while reducing a loading space and weight of the battery module.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

Meanwhile, when the terms indicating up, down, left, right, front and rear directions are used in the specification, it is obvious to those skilled in the art that these merely represent relative locations for convenience in explanation and may vary based on a location of an observer or a shape in which an object is placed.

What is claimed is:

1. A battery module, comprising:
  a plurality of secondary batteries, each including an electrode assembly and a pouch exterior configured to accommodate the electrode assembly in an inner space thereof and having a sealing portion provided thereto, the plurality of secondary batteries being arranged in a vertical direction in a state of being laid in a horizontal direction;
  a plurality of cartridges configured to be stacked in a vertical direction, each cartridge being coupled in contact with the sealing portion of one of the plurality of secondary batteries within the cartridge to surround the sealing portion and being made of thermally-conductive material, and each of the plurality of cartridges having an open top and an open bottom;
  a sensing cover configured to sense a voltage of at least one secondary battery of the plurality of secondary batteries, to provide an electrode terminal of the battery module, and to cover an electrode lead of the at least one secondary battery of the plurality of secondary batteries at an outer side; and
  outer covers respectively provided at upper and lower portions of the battery module,
  wherein the sensing cover includes an extended portion, which protrudes from the sensing cover, the extended portion extending perpendicularly from the sensing cover to extend toward the outer covers so that upper and lower ends of the sensing cover respectively cover a part of upper and lower portions of the outer covers, and the extended portion of the sensing cover is fixed to the outer covers,
  wherein an outermost surface of each of the outer covers includes a recessed portion to receive the extended portion of the sensing cover therein such that outermost surfaces of the extended portion of the sensing cover are coplanar with the outermost surfaces of the outer covers,
  wherein adjacent secondary batteries of the plurality of secondary batteries are in direct contact with each other through the open tops and open bottoms of the plurality of cartridges, and
  wherein a thermal conductivity of the thermally-conductive material is 1 W/mK or above.

2. The battery module according to claim 1, wherein at least a part of the cartridge includes a thermally-conductive polymer or includes a thermally-conductive material containing thermally-conductive filler and polymer.

3. The battery module according to claim 1, wherein the cartridge is made of the same material as a whole.

4. The battery module according to claim 1, wherein the cartridge has a tetragonal ring shape, when being observed downwards from above and is configured to surround a periphery of the pouch exterior at a portion of the pouch exterior that defines the inner space and contacts an outer side of the portion of the pouch exterior.

5. The battery module according to claim 1, wherein each cartridge is formed by insert molding to be coupled in contact with the sealing portion of the one of the plurality of secondary batteries.

6. The battery module according to claim 1, wherein the battery module has at least one vertical sectional pattern in which a cartridge and a secondary battery coupled to each other as a unit come into continuous contact with each other from a left end to a right end thereof.

7. The battery module according to claim 1, wherein the cartridge has a plurality of coupling protrusions having a hook shape and a plurality of coupling grooves into which the coupling protrusions are inserted, formed at an outer circumference thereof with shapes corresponding to each other.

8. The battery module according to claim 1, further comprising:
an outer cover configured to cover an upper or lower portion of one of the plurality of secondary batteries and one of the plurality of cartridges located at an uppermost or lowermost location and made of thermally-conductive material.

9. The battery module according to claim 8,
wherein the outer cover has a concave portion formed in a lattice pattern at an outer surface thereof.

10. The battery module according to claim 1, further comprising:
a cooling medium supply unit configured to supply a cooling medium so that the cooling medium flows at an outer side of the cartridge.

11. A battery pack, comprising the battery module according to claim 1.

12. A vehicle, comprising the battery module according to claim 1.

13. The battery module according to claim 1,
wherein each cartridge directly contacts an upper surface of the sealing portion and a lower surface of the sealing portion.

* * * * *